US006850021B1

(12) United States Patent
Golownia et al.

(10) Patent No.: US 6,850,021 B1
(45) Date of Patent: Feb. 1, 2005

(54) PRECISION VIRTUAL ENCODER

(75) Inventors: John Golownia, Milwaukee, WI (US); Thomas Rehm, Mequon, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 10/652,263

(22) Filed: Aug. 29, 2003

(51) Int. Cl.[7] .............................................. H02K 17/32
(52) U.S. Cl. ........................ 318/432; 318/434; 318/254
(58) Field of Search .................................. 318/432, 254, 318/138, 439, 433, 434

(56) References Cited

U.S. PATENT DOCUMENTS

2003/0052633 A1 * 3/2003 Inagaki et al. ............... 318/432
2003/0067278 A1 * 4/2003 Nakamura et al. ........... 318/254

* cited by examiner

Primary Examiner—Karen Masih
(74) Attorney, Agent, or Firm—Quarles & Brady LLP; William R. Walbrun

(57) ABSTRACT

A virtual encoder is provided as a software component of a motor drive that integrates a command speed to produce a desired position drive signal. The desired position drive signal is converted to an actual position drive signal that is constantly maintained within a predetermined integer error margin of the desired position drive signal.

23 Claims, 2 Drawing Sheets ics: 6,850,021 B1

PRECISION VIRTUAL ENCODER

CROSS-REFERENCE TO RELATED APPLICATIONS

BACKGROUND OF THE INVENTION

1. Field of the Invention

The present invention relates to motor controls generally, and in particular to a virtual encoder for receiving a velocity input signal and producing a position reference output signal using a software algorithm that achieves system component reduction compared to an implementation solution using conventional physical encoders.

2. Discussion of the Related Art

Rotating motors are typically controlled by a motor drive that receives a desired motor speed signal and, based on the motor speed signal, produces and outputs a torque signal that is applied to the motor. Adjustment of the torque signal based on changes to the desired motor speed signal relative to the actual motor speed ensures that the motor rotates at the desired speed. However, when operating a plurality motors synchronously in an automated system, several factors exist that may cause the position of the motors to deviate from each other even though they are all operating under the same desired motor speed signal. For instance, motor inertia and other losses at each motor are non-uniform, and could cause one motor to drift from the other motors. It would thus be desirable to implement a position feedback loop, whereby the position of each motor is compared to a desired motor position so that the torque output to each individual motor may be adjusted to compensate for motor drifting.

Conventional drive systems include an optical motor encoder that detects and counts the passage of optical marking present on a disk that rotates along with the rotating load during operation. In a system utilizing several synchronous motors, the corresponding encoders are thus able to determine the position of each motor during operation as a function of the number of detected markings.

Accordingly, one possible implementation of a position feedback loop could include a conventional optical encoder in the reference path that is installed as a drive reference encoder. The drive position reference encoder would measure the desired motor speed using the rotation of a mechanical shaft on the encoder, it being appreciated that the encoder shaft would carry optical markings that correspond to the markings present on the rotating motor load. A relationship would thus exist between the passage of optical drive encoder shaft markings and the passage of optical load markings. An optical sensor present on the drive encoder could then sense the position of the shaft as the shaft rotates in response to the desired motor speed signal. Based on the sensed position of the shaft, the drive encoder would output a desired position signal that is used by the motor drive when determining the torque signal output to the motor.

However, it should be appreciated that conventional motor drives are software-based, and that implementing a physical encoder in such a system would be cumbersome and impractical. What is therefore needed is a software-based position reference encoder, that can be integrated into the firmware of an existing motor drive, and that is capable of receiving a desired motor speed signal and outputting a desired motor position signal within a predetermined margin or error.

BRIEF SUMMARY OF THE INVENTION

In accordance with one aspect of the invention, a motor drive is provided that outputs a torque signal to a motor. The drive includes a signal source outputting a desired motor speed signal. A virtual encoder receives the desired motor speed signal and produces a delta position signal based at least in part on the desired motor speed signal. The virtual encoder outputs a desired position signal that differs from the delta motor position signal by an error that is maintained to a value less than a predetermined integer.

The above aspects of the invention are not intended to define the scope of the invention for which purpose claims are provided. In the following description, reference is made to the accompanying drawings, which form a part hereof, and in which there is shown by way of illustration, and not limitation, a preferred embodiment of the invention. Such embodiment does not define the scope of the invention and reference must be made therefore to the claims for this purpose.

BRIEF DESCRIPTION OF THE DRAWINGS

Reference is hereby made to the following figures in which like reference numerals correspond to like elements throughout, and in which.

DETAILED DESCRIPTION OF THE INVENTION

Figure 1:
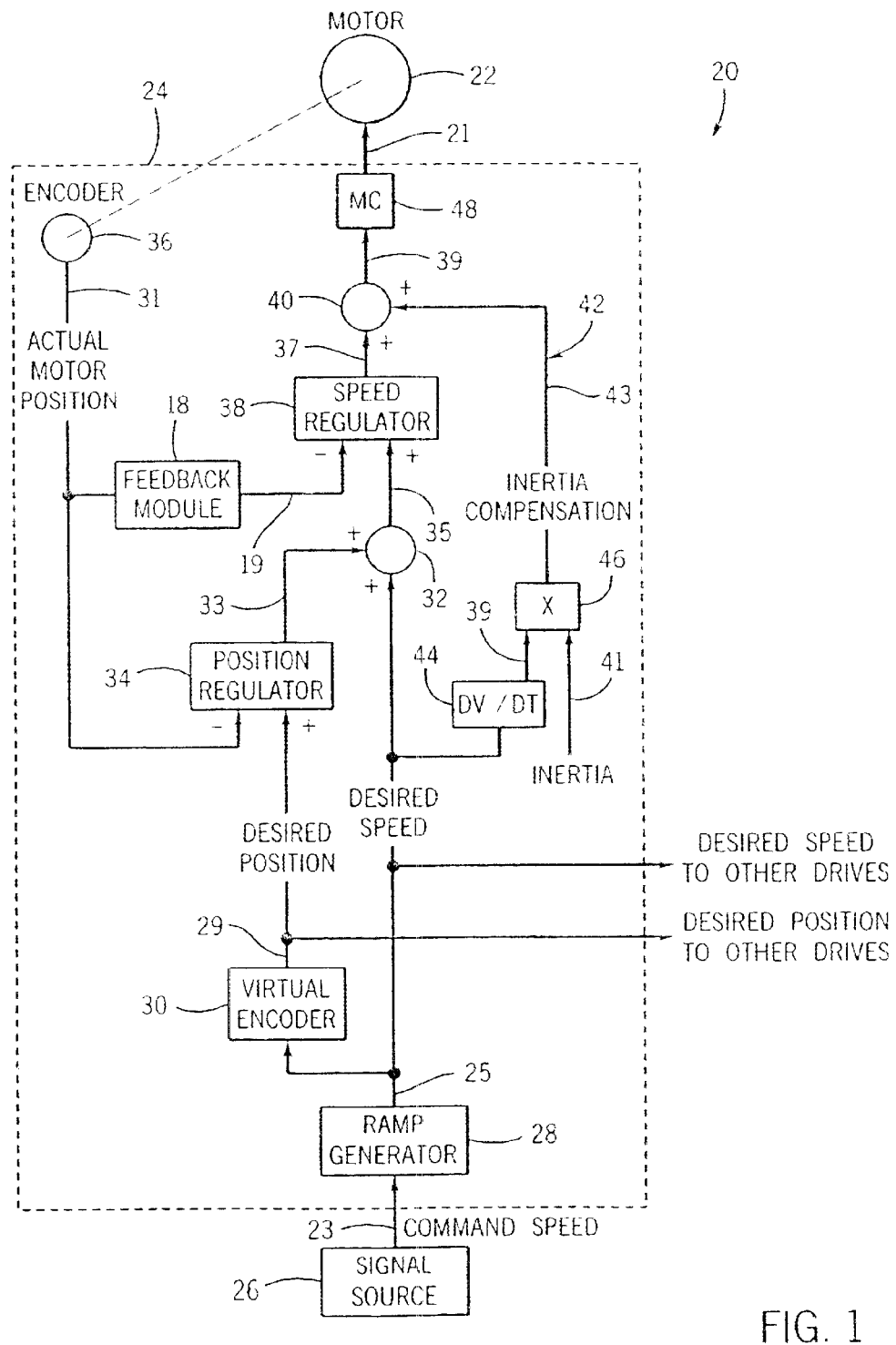
FIG. 1 is a schematic block diagram of a motor control system incorporating a virtual encoder constructed in accordance with the preferred embodiment.

Referring initially to FIG. 1, a control system 20 includes a conventional motor 22 having a rotatable load (not shown). Motor 22 is of the type that receives a torque input signal 21 from a motor drive 24 and rotates the load at a desired speed in response to the torque input signal 21. A plurality of radially displaced optical markings (not shown) are disposed about the periphery of a disk that rotates with the load. An optical encoder 36 includes a scanner that identifies the passage of each marking to enable the determination of the load position, as will be described in more detail below. The motor drive 24 receives a command speed signal 23 from a signal source 26, and converts the command speed signals into torque signals that are recognized by motor 22. The torque signals are adjusted during operation based on 1) a deviation between the actual load position and desired load position, and 2) motor inertia that prevents the motor 22 from immediately reacting fully to a change in the torque input signal 21.

Signal source 26 may comprise any conventional device capable of receiving an input related to a desired speed of motor rotation. The input can either be manually entered (e.g., via a man machine interface) or can be automatically provided to the signal source 26 via an automated control system. The components of motor drive 24 are programmed in the drive firmware. One such component is a ramp generator 28 that receives the command speed signal 23 from signal source 26, and produces a desired speed signal 25 that transitions, or ramps, up or down to the input command speed signal 23. For instance, ramp generator 28 prevents abrupt changes in the torque command that is input to the motor 22 in order to reduce stress that would be experienced by the motor components if the torque signal were to abruptly change.

During operation, when the command speed signal 23 is applied to ramp generator 28, the ramp generator determines the difference between the current command speed signal and the previous command speed signal. The ramp generator 28 then determines a period of time necessary to transition the desired speed signal 25 to a level corresponding to the command speed signal 23. The desired speed signal 25 may be ramped linearly by the ramp generator 28, or may be ramped hyperbolically or in any other suitable manner that safely transitions motor 22 to the command speed signal 23.

Figure 2:
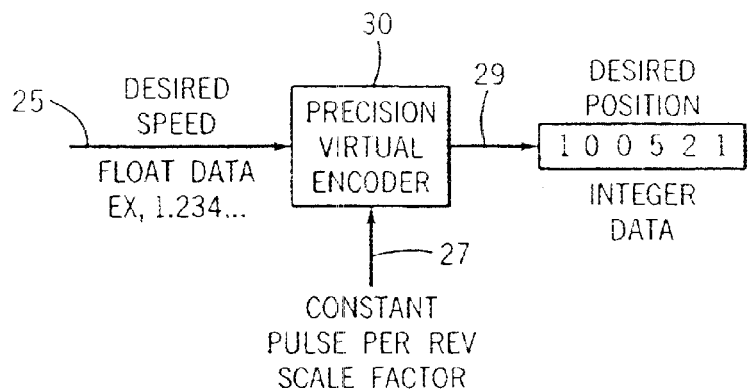
FIG. 2 is a diagram of the virtual encoder illustrated in FIG. 1 receiving a velocity reference input and outputting a position reference.

The ramp generator 28 outputs the desired speed signal 25 to both a virtual position encoder 30 and to one input of an addition module 32. Encoder 30 is virtual in that it is programmed in firmware of motor drive 24 and achieves system component reduction compared to conventional encoders. Referring now to FIG. 2, encoder 30 receives the desired speed signal 25 from ramp generator 28 and, based on a constant scale factor 27 of the pulses per revolution of motor 22 (typically 4096), integrates the input speed reference signal. Encoder 30 thus produces and outputs a desired position signal 29 that is an integer corresponding to an optical load marking count.

Referring again to FIG. 1, the desired position signal 29 is subsequently output to a position regulator 34. Position regulator 34 also receives an actual motor position signal 31 which reflects a measurement of the optical position count determined by encoder 36. The actual motor position signal 31 is subtracted from the desired position signal 29 by the position regulator 34. Accordingly, position regulator 34 produces an output signal 33 that corresponds to the magnitude of the discrepancy between the actual motor position and desired motor position. The position regulator signal 33 is one component used to determine the torque input signal 21 that is applied to motor 22.

The position regulator signal 33 and the desired speed signal 25 are both output to an addition module 32. The sum 35 of the two signals is sent from the addition module 32 to one input of a speed regulator 38. The other input of the speed regulator 38 is provided by a feedback module 18 that receives and determines the derivative of the actual motor position signal 31 to produce an actual motor speed signal 19. The speed regulator 38 subtracts the actual motor speed signal 19 from the output 35 of addition module 32 to produce a speed regulator output signal 37 whose level corresponds to the difference between sum 35 and actual motor speed signal 19. The speed regulator output signal 37 is output to one of the inputs of an addition module 40. It should thus be appreciated that encoder 36, regulator 38, and adding module 40 provide a net output to motor control module 48 that adjusts the torque input signal 21 based on variations between the actual motor position and the desired motor position.

The other input to addition module 40 is provided by an inertia compensation loop 42, which includes a derivative module 44 that determines the derivative of the desired speed signal 25 output by the ramp generator 28 (ramping rate). A ramp rate signal 39 corresponding to the calculated ramping rate is provided to one input of a multiplier 46. The second input of multiplier 46 receives an inertia coefficient signal 41 related to the inertia of motor 22. The inertia coefficient is multiplied by the ramping rate signal, and the product is output as an inertia compensation signal 43 that is applied to the other input of addition module 40. The addition module 40 adds the inertia compensation signal 43 to the speed regulator output signal 37, and outputs the sum 39 of the two signals to a motor control 48, which converts the input signal 39 to the torque input signal 21 that is applied to motor 22.

Inertia compensation loop 42 recognizes that changes in torque input signals 21 to the motor 22 will be resisted by the inertia of the motor 22, whether spinning or at rest. The inertia compensation signal 43 thus provides an additional signal that counteracts the inherent resistance of motor 22 to changes in speed. It should be appreciated that if the ramp generator 28 outputs decreasing desired speed signals 25, the derivative calculated by module 44 would be negative, thereby reducing the torque input signal 21 that is applied to motor 22.

The desired speed signal 25 and desired position signal 29 are sent to other drives controlling motors that are to be operated synchronously with motor 22. It should be appreciated in this regard that drive 24 is a leader drive that sends signals to a plurality of follower drives. Follower drives include the same components as drive 24 with the exception of ramp generator 28 and virtual encoder 30. The remaining components of the leader and follower drives ensure that all motors operate at the same speed and at the same position, and that adjustments are made to correct position errors when an actual position of a given motor does not equal the desired position of the motor. Accordingly, only one virtual encoder is necessary for a system operating a plurality of synchronous motors.

Figure 3:
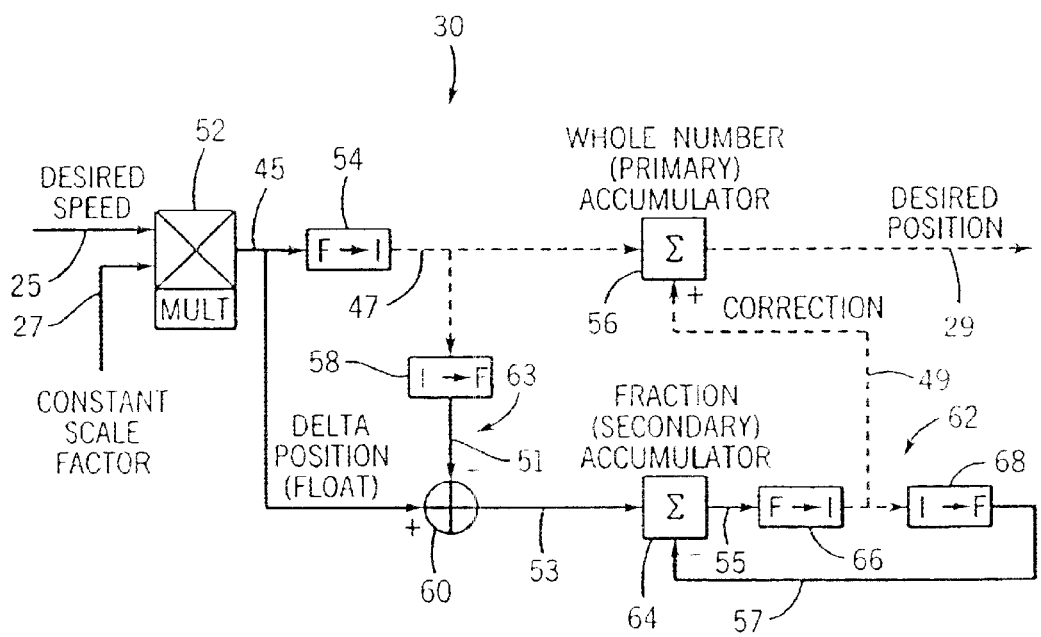
FIG. 3 is a schematic block diagram of the components of the virtual encoder illustrated in FIG. 1.

Operation of the virtual encoder 30 will now be described with reference in particular to FIG. 3. Virtual encoder 30 includes a multiplier 52 that receives the desired speed signal 25 from ramp generator 28 along with the constant scale factor 27 that is determined as a constant number of pulses per motor revolution. Multiplier 52 produces a product of the desired speed signal 25 and constant scale factor that provides a calculated delta position signal 45 expressed as position (or optical clicks) per unit time. The calculated delta position signal 45 is represented as float data, meaning that the data is expressed as a real number or any suitable data type capable of resolving precision to a high number of decimal places, such as tenths, hundreds, thousandths, millionths, etc.

The float data 45 is then sent to a "float to integer" converter 54 that modifies the float data 45 by truncating the float data 45 to the nearest integer to produce an actual position signal 47 represented as an integer. The float data 45 is preferably truncated because and error correction loop 62 will be used to adjust the truncated data, as required. Details of the error correction loop 62 will be described below.

The actual position output signal is sent to a primary accumulator 56 that continuously accumulates integer data, thereby integrating the desired speed signal 25 as a function of the constant scale factor 27. Because only integer numbers may be output by encoder 30 in order to accommodate the resolution of optical markings on motor 22, the calculated delta position signal 45 differs from the actual position signal 47 by a value less than one for any given iteration. However, as calculated delta position signals 45 are constantly updated, the errors may accumulate significantly. In order to compensate for the accumulation of such errors, the virtual encoder 30 includes an error correction loop 62. The desired position signal 29 output by the primary accumulator 56 thus includes both the actual position signal 47 along with an error correction signal 49. Accordingly, the desired position signal 29 is a corrected position signal that maintains the error between the desired position signal 29 and the delta position signal 45 within a predetermined integer, as will now be described.

An error calculation mechanism 63 includes an "integer to float" converter 58 that receives the actual position signal 47 from converter 54. Converter 58 converts the truncated integer to float data having the same floating point precision as the calculated delta position signal 45 output by multiplier 52. The output 51 from converter 58 is subtracted from the delta position signal 45 at subtraction module 60 to produce a difference (error factor) 53 that is less than one in magnitude.

The error factor 53, having a predetermined floating point precision, is output from subtraction module 60 to error correction loop 62, which continuously accumulates error factors and, converts the error factors to integers that is output to primary accumulator 56. In particular, correction loop 62 includes a secondary accumulator 64, which continuously adds error factors 53 output from subtracting module 60, and forwards accumulated error 55 to a "float to integer" converter 66. Accordingly, if the accumulated error 55 is greater than one in magnitude, converter 66 produces the error correction signal 49 as a non-zero integer that is subsequently output to primary accumulator 56 and added to the actual position signal 47. The sum thus output by primary accumulator 56 is the desired position signal 29 that is applied to position regulator 34 as described above. It should be appreciated that the data in primary accumulator 56 does not reset, but rather continuously increases from its previous value as additional desired speed signals 25 are input to multiplier 52.

If the accumulated error 55 output from accumulator 64 is less than one, the error correction signal 49 output by converter 66 is zero, and the desired position signal 29 remains unaffected. However, if the accumulated error 55 is greater than one in magnitude, converter 66 truncates the float data and the error correction signal 49 is expressed as a truncated integer and applied to primary accumulator 56. The error correction signal 49 is then converted to float data via "integer to float" converter 68 having the same floating point precision as the float data output by secondary accumulator 64. The output 57 from converter 68 is subsequently subtracted from the running total in accumulator 64. Accordingly, as the accumulated error 55 accumulates to values greater in magnitude than one, 1) the integer representation of that error appears in the error correction signal 49 that is forwarded to primary accumulator 56 to correct the output of virtual encoder 30 and 2) the total in accumulator 64 is reduced by the floating point representation 57 of the integer error correction 49 that was forwarded to accumulator 56.

The error correction loop 62 preferably operates at a sufficiently high speed such that correction data will be forwarded to accumulator 56 every time the value in secondary accumulator 64 exceeds the value of one. Accordingly, the error in secondary accumulator is constantly maintained less than a predetermined integer that depends on the speed of loop 62.

It should furthermore be appreciated, that the virtual encoder 30 as discussed above, will support operation in both the forward and reverse directions. The desired speed 25 can be either positive or negative in sign, resulting in a corresponding increase or decrease in desired position 29. The math employed in virtual encoder 30 will correctly handle the signed data in both cases.

Advantageously, a software-based virtual encoder 30 outputs a desired position signal 29 that is as accurate as a signal that would be output using a conventional physical encoder. In particular, the encoder outputs a desired position signal 29 that is generally within the one motor position count, or one click. Because 4096 optical markings are typically present on motor 22 that interacts with optical encoder 36, virtual encoder produces the position reference signal within a 1/4096 motor revolution error range. The position reference signal accuracy is maintained over the entire integer number range of desired position 29 by the presence of error correction loop 62.

Furthermore, the software implementation of the above-described algorithm of virtual encoder 30 can be accomplished efficiently. A version of this algorithm can be written in only seven lines of C language source code, as appreciated by one having ordinary skill in the art. The code contains no branch instructions which enhances operation on microprocessors using pipelined architectures.

The above has been described as a preferred embodiment of the present invention. It will occur to those that practice the art that many modifications may be made without departing from the spirit and scope of the invention. In order to apprise the public of the various embodiments that may fall within the scope of the invention, the following claims are made.

We claim:

1. A motor drive providing a torque signal to a motor, comprising:

a signal source outputting a desired motor speed signal; and a virtual encoder receiving the desired motor speed signal and producing a delta position signal based at least in part on the desired motor speed signal, wherein the virtual encoder outputs a desired position signal that differs from the delta motor position signal by an error that is maintained to a value less than a predetermined integer.

2. The motor drive as recited in claim 1, wherein the desired motor speed signal and desired motor position signal are output to other motor drives.

3. The motor drive as recited in claim 1, wherein the virtual encoder further comprises a multiplier receiving the desired motor speed signal along with a constant scale factor and producing the delta position signal.

4. The motor drive as recited in claim 3, wherein the delta position signal is converted to an actual position signal, expressed as an integer, that is forwarded to an accumulator, and wherein the actual position signal deviates from the delta motor position signal by an error margin.

5. The motor drive as recited in claim 4, further comprising an error correction loop that accumulates error margins and outputs an error correction signal to the accumulator when the accumulated error margin exceeds a predetermined threshold.

6. The motor drive as recited in claim 5, wherein the predetermined threshold is an integer.

7. The motor drive as recited in claim 3, wherein the constant scale factor is related to a number of pulses per revolution of the motor.

8. The motor drive as recited in claim 1, further comprising an inertia compensation loop dependent in part on the desired motor speed signal and motor inertia.

9. The motor drive as recited in claim 1, further comprising a position feedback loop depending in part on the actual desired position signal.

10. The motor drive as recited in claim 1, wherein the virtual encoder resides in firmware of the motor drive.

11. A virtual encoder for a motor drive, comprising:

a calculated position signal output device using a desired velocity signal and a constant scale factor to produce a delta position signal;

a converter that receives the delta position signal and outputs an actual position signal that deviates from the delta position signal by an error margin;

an error correction mechanism that receives the error margin and outputs a correction signal when the error margin accumulates beyond a predetermined threshold; and an accumulator that adds the actual position signal to the correction signal to produce a corrected position signal; and an output device outputting the corrected position signal.

12. The virtual encoder as recited in claim 11, wherein the accumulator and the output device are integrated as a single device.

13. The virtual encoder as recited in claim 11, wherein the encoder resides in firmware of a motor drive.

14. The virtual encoder as recited in claim 11, wherein the error correction mechanism determines a difference between the delta position signal and the actual position signal.

15. The virtual encoder as recited in claim 14, wherein the error correction mechanism further comprises an accumulator that accumulates error margins.

16. The virtual encoder as recited in claim 15, wherein the error correction mechanism further comprises a converter that outputs the correction signal when the accumulated error margin exceeds a predetermined threshold.

17. The virtual encoder as recited in claim 16, wherein the accumulator receives a difference between a previously accumulated error margin and the output correction signal.

18. The virtual encoder as recited in claim 11, wherein the converter truncates the delta position signal to produce the actual position signal.

19. A method for producing a desired position signal for a motor drive, the method comprising the steps of:

A) receiving a desired velocity signal and constant scale factor;

B) based on the desired velocity signal and constant scale factor, computing a delta position signal;

C) converting the delta position signal to an actual position signal that deviates from the delta position signal by an error margin;

D) outputting a correction signal when the error margin exceeds a predetermined threshold; and E) adding the actual position signal to the correction signal to produce the desired position signal.

20. The method as recited in claim 19, wherein step (C) further comprises converting the calculated position signal to an integer.

21. The method as recited in claim 19, wherein step (D) further comprises accumulating error margins as multiple delta position signals are computed.

22. The method as recited in claim 19, wherein step (E) further comprises outputting the correction signal as an integer.

23. The method as recited in claim 19, further comprising producing a new error margin as a difference between the correction signal and a previously accumulated error margin.

* * * * *